United States Patent
Van Dusen

(10) Patent No.: US 11,762,912 B2
(45) Date of Patent: Sep. 19, 2023

(54) SYSTEM AND METHOD FOR FUZZY CONCEPT MAPPING, VOTING ONTOLOGY CROWD SOURCING, AND TECHNOLOGY PREDICTION

(71) Applicant: Dennis Alan Van Dusen, Ellicott City, MD (US)

(72) Inventor: Dennis Alan Van Dusen, Ellicott City, MD (US)

( * ) Notice: Subject to any disclaimer, the term of this patent is extended or adjusted under 35 U.S.C. 154(b) by 50 days.

(21) Appl. No.: 17/316,469

(22) Filed: May 10, 2021

(65) Prior Publication Data
US 2022/0027416 A1    Jan. 27, 2022

Related U.S. Application Data

(62) Division of application No. 14/014,229, filed on Aug. 29, 2013, now Pat. No. 9,461,876.

(Continued)

(51) Int. Cl.
*G06F 16/903* (2019.01)
*G06F 16/904* (2019.01)
(Continued)

(52) U.S. Cl.
CPC ...... *G06F 16/90335* (2019.01); *G06F 16/904* (2019.01); *G06F 30/20* (2020.01); *G06N 5/02* (2013.01); *G06N 5/04* (2013.01); *G06N 20/00* (2019.01); *G06Q 10/10* (2013.01); *G06Q 10/101* (2013.01); *G06Q 30/0201* (2013.01); *G06Q 30/0241* (2013.01); *G06Q 30/0279* (2013.01); *G06Q 50/01* (2013.01); *G06Q 50/184* (2013.01); *G07C 13/00* (2013.01); *H04L 41/04* (2013.01); *G06F 2111/10* (2020.01); *G06Q 40/06* (2013.01); *G06Q 50/18* (2013.01); *G06Q 50/20* (2013.01); *G06Q 2220/12* (2013.01); *G06Q 2230/00* (2013.01)

(58) Field of Classification Search
None
See application file for complete search history.

(56) References Cited

U.S. PATENT DOCUMENTS

| | | | |
|---|---|---|---|
| 7,043,454 B2 * | 5/2006 | Powell | G06Q 40/04 |
| | | | 705/37 |
| 2002/0049692 A1 * | 4/2002 | Venkatram | G06F 16/958 |
| | | | 706/45 |

(Continued)

FOREIGN PATENT DOCUMENTS

| | | | | |
|---|---|---|---|---|
| WO | WO-0217108 A1 * | 2/2002 | | G06Q 10/10 |
| WO | WO-2015044706 A1 * | 4/2015 | | G06Q 30/0241 |

*Primary Examiner* — Kenny S Lin

(57) ABSTRACT

The invention provides a system and method for providing ttx-based categorization services and a categorized commonplace of shared information. Currency of the contents is improved by a process called conjuring/concretizing wherein users' thoughts are rapidly infused into the Map. As a new idea is sought, a goal is created for a search. After the goal idea is found, a ttx is concretized and categorized. The needs met by such a Map are prior art searching, competitive environmental scanning, competitive analysis study repository management and reuse, innovation gap analysis indication, novelty checking, technology value prediction, investment area indication and planning, and product technology comparison and feature planning.

10 Claims, 5 Drawing Sheets

Related U.S. Application Data

(60) Provisional application No. 61/694,259, filed on Aug. 29, 2012.

(51) Int. Cl.

| | | |
|---|---|---|
| *G06N 20/00* | (2019.01) | |
| *G06N 5/04* | (2023.01) | |
| *H04L 41/04* | (2022.01) | |
| *G06Q 10/10* | (2023.01) | |
| *G06F 30/20* | (2020.01) | |
| *G06Q 10/101* | (2023.01) | |
| *G06N 5/02* | (2023.01) | |
| *G06Q 30/0201* | (2023.01) | |
| *G06Q 30/0241* | (2023.01) | |
| *G06Q 30/0279* | (2023.01) | |
| *G06Q 50/00* | (2012.01) | |
| *G06Q 50/18* | (2012.01) | |
| *G07C 13/00* | (2006.01) | |
| *G06F 111/10* | (2020.01) | |
| *G06Q 40/06* | (2012.01) | |
| *G06Q 50/20* | (2012.01) | |

(56) References Cited

U.S. PATENT DOCUMENTS

| | | | |
|---|---|---|---|
| 2005/0044135 A1* | 2/2005 | Klausnitzer | G06Q 20/20 705/16 |
| 2007/0011204 A1* | 1/2007 | Sorensen | G06Q 50/18 |
| 2009/0018932 A1* | 1/2009 | Evans | G06Q 30/02 707/999.102 |
| 2009/0182624 A1* | 7/2009 | Koen | G06Q 40/04 705/37 |
| 2009/0204507 A1* | 8/2009 | Cockayne | G06Q 20/10 705/26.1 |
| 2010/0031020 A1* | 2/2010 | Goldstein | G06F 21/6245 713/153 |
| 2014/0188838 A1* | 7/2014 | Strugov | G06Q 30/0282 707/710 |
| 2019/0130507 A1* | 5/2019 | Stollman | H04L 9/0637 |

\* cited by examiner

SYSTEM AND METHOD FOR FUZZY CONCEPT MAPPING, VOTING ONTOLOGY CROWD SOURCING, AND TECHNOLOGY PREDICTION

This application references and is derived from provisional patent application Ser. No. 61/694,259, and this application claims priority from that provisional application. This application is divisional from patent application Ser. No. 14/014,229. This specification follows the finalized non-provisional patent application Ser. No. 14/014,229 as corrected for informalities, but is condensed.

FIELD OF INVENTION

The invention relates generally to the field of information technology. More specifically, but not by way of limitation, the invention relates to a system and method for concept-based management of categorizations or classifications to organize a commonplace, enhancing the navigability of very large information bases by providing in-depth sub-categorization of terminology bases, providing users with incentives to be creative, protecting crowd sourced contributions, managing searches for what is known either within, or in some accessible location outside of it, and establishing communities associated especially with the concepts, or its narrow categories, and particularly in Intellectual Property. It provides a user a searching tool for something known or unknown, capturing the concept if unknown to be reused as if known. This invention extends to new forms of fuzzy clustering and hierarchical self-organizing maps.

To think outside the box, you have to know what is in it. This system provides a map of what is inside.

Today, in fields ranging from the general use of conceptual diagraming to specific purposes such as prior art searching, competitive environmental scanning, competitive analysis study repository management and reuse, innovation gap analysis identification, novelty checking, technology prediction, investment identification and planning, and product technology comparison and feature planning, users are ever more in need of finding very specific and highly relevant information from a mass of data that is not organized.

Known systems for ideation and innovation, developed over centuries, are closed so that the ideas generated are hidden for long periods. While this is somewhat effective in a commercial sense, the attitude fostered and results are often counter-productive for society. Modern concepts of open software and crowd sourcing, coming from the utopian view, also have faults.

Intellectual Property Classification management services may include, for instance, ideation, intellectual property categorization, information asset categorization, product management, product line management, competitive analysis, study management, study outsourcing, development outsourcing, information categorization and retrieval management, contract management, communities, technology advertising, incentives management, collaboration management, and, emergence games involving technology.

Known systems and methods for providing complex conceptual data for searching associatively, along with the connected management of search, retrieval, and categorization services have many disadvantages, however. Present topic maps are of limited use because firm and precise identification of subjects in topic maps works only with a limited set of locators. They cannot easily be kept current or organized. They fail to predict, and they are inefficient. Previous systems have not used capturing of conjuring and only one known project has incorporated the idea of consensus through voting. Previous research efforts have not focused on the business process elements of the problem.

What is needed is an improved categorization, search and retrieval management paradigm combined into a tool that: empowers users to proactively seek a better understanding of the best available knowledge; stirs imagination; provides deep and dynamic prior art classification; addresses the full life cycle of knowledge refinement; and manages the progress of ideas from conception to description to protection to collaboration to securitization and to public release and use for the next great idea. It must bring in knowledge so that a user sees it as already having the knowledge in order for the user to trust it as a search tool. While we extend beyond present inventions, we acknowledge the prior work done in:

Taxonomy, ontology, C-spaces, concept maps, topic maps, Common Mental Map, and intellectual property valuation methods;

Authority maintenance and ontological merging techniques for collective categorization;

Semantic distancing, self-organizing mapping, cluster analysis, cross-citation, crawling and other techniques for automatic categorization operations.

Gap analysis, TRIZ, road mapping, gestation period analysis, Delphi, and ideation/brainstorming techniques.

SUMMARY OF THE INVENTION

The invention provides, in one embodiment, a system and method for providing crowd sourced consensus building, topic categorization services, a commonplace, and on-line community services by topics.

A result of the system and method is a Common Mental Map (CMM) for navigation. Visualization maps provide a customized view of this 'best available' information commonplace. Different visualizations and views provide efficient tools to communities. Information from users and disparate external sources is combined and merged to form a more complete commonplace.

A user searching for something, known or unknown, provides one source of information for the commonplace. By capturing the concept searched for, the system saves the creative thought for reuse, and captures the fact of the search for that concept for value prediction.

As a goal-based search is performed for what a user believes is a concept already known, the goal is moved in the map to a location where the concept may most likely be found, and if the user is not successful in finding a match, the goal itself is concretized as representing the concept being search for, and categorized into where the goal was moved to, thus making a new concept out of a mere thought of the user. When a user conjures a concept and wishes to save it in the system, a representation is concretized and one or more categorization techniques are considered for categorizing the concept. The representation becomes an indexing point for attachment of information resources. After the concept is described, it may be shared with others, form the basis for investment or social interaction, used in a classification index or a mashup, or be used as a category for new ideas. Finally, the concept's characteristics, its categorization, and its importance may be reviewed by the crowd to determine changes needed, and new ideas are discovered, closing the lifecycle. The commonplace provides for analysis and prediction on a 'best available' data basis.

The term concept is too general to be used in the following. Generally, concepts are ttxs represented by cnxpts. The Topic Map Standard 'subject' is similar to the ttx, and the 'topic' is similar to the cnxpt, but more general.

The following outlines a search and categorization tool useful, in one embodiment, for rapidly finding tcepts, TPLs, or appcepts stored in a CMMDB that contains a structured list of categories including, but not limited to: fields of study, categories of tcepts, and categories of appcepts.

In one embodiment, the categorization is visualized, in one CM MV visualization technique called a map, as a visible 'skin' of a sphere that represents, including, but not limited to, a: cnxpt, goal, tcept, tcept category, TPL, tplxpt, appcept, appcept category. The CM MV 'category' spheres may contain internal spheres that represent, including, but not limited to, a: tcept, tcept category, appcept, appcept category, or another ttx. The CMMV 'category' structure is derived from various relationships in the CMMDB. The CMMDB is initially populated by automated consolidation of existing indices and tools such as cluster and cross-citation analysis, but is maintained and extended by crowd source collaboration, the ease of which is improved by effective visualization and editing interfaces. 'Votes' on the existence, validity, relationships, categorization, relevance of external information, and data quality of info-items within the CMMDB are the basis for reaching consensus on the accuracy of the categorization, prediction, naming, and description.

The utility of this is that it provides a facility to assist users in their daily activities involving, including, but not limited to: ideation, innovation, product planning, and competitive intelligence. Users are often expected to be technology workers or intellectual property workers. In each case, the users will need to organize their work. This system provides a toolset for staying organized. It is intended to contain the basis of categorization for, including, but not limited to, ttxs and tcepts. The tcepts are not only historic, but prospective.

The utility of this is that it provides a management tool for crowd sourcing in innovation to bridge from older patent protection systems to first to file patent systems, to utopian open source systems while protecting inventors. It provides a management tool to serve various sets of users needing information at different phases of its gestation, including but not limited to: armchair inventors and science fiction writers conjuring futuristic ideas, entrepreneurs and investors concerned about practical ideas not yet developed, product planners and competitive analysis working on product lines, and researchers, educators, individuals and governments concerned with new ideas and networking, providing to each answers they need. Futurists and creative people effectively 'out' their technology ideas into the 'map' and then, on a collaborative basis, the ideas are improved and re-categorized, making it usable for the users having funds who can pay for the information. The constraint of data quality is reduced into a positive because the impurities in the data become a force toward innovation itself, giving other users a spark known as an 'adjacent possible'. The result is a proactive system for creativity measurement and tool for affecting and directing technology.

Purposes

An embodiment of the invention provides management of a CMMDB in a specific domain of the owner's choice.

An embodiment of the invention provides a tool for depicting a map of the ttxs in a CMMDB, allowing map navigation, searching, refinement operations, execution of analytics, and interaction with associated communities.

An embodiment of the invention provides the mechanisms and procedures to achieve a CMMDB that is the best available source for a list of ttxs.

An embodiment of the invention provides the mechanisms and procedures to achieve a CMMDB database that is the best available source for a list of txpts and appcepts.

An embodiment of the invention provides the mechanisms and procedures to utilize a combination of user discussions, categorizations from outside, collected concretizations of conjurings, and the prior state of the stored Common Mental Map to provide a base upon which to users can search for abstract thoughts that are converted to new categorized ttxs to provide a continually improved and explicit formal specification of the ttxs that are assumed to exist in some Area of Interest and the relationships that hold among them.

An embodiment of the invention provides a method and apparatus for providing ttx categorizations ("maps") and visualizations, comprising: 1) the Preparation step comprising planning the ttx map study, 2) the Generation step comprising: receiving data indicating a ttx, the data including at least one of a defining of a search goal, a defining of a query, a marking of a place on a visualization derived from the CMMDB, an extension of a ttx, a subdividing of a ttx, a combining of two ttxs to form a convergence, a defining of a new ttx, a defining of a contradictory feature or requirement for an existing ttx, a coalescing of a ttx into the CMMDB, a stating that a ttx is defined by an information resource; 3) the Structuring step comprising: categorizing the data indicating the ttx to associate the data with one of a predetermined plurality of categories or into a new category; 4) the Representation step comprising: calculating the similarities of ttxs; summarizing fxxt calculation specifications to extract pertinent ttxs and relationships; forming representative scene graph maps; distributing the scene graphs to a user computing system; generating the visualization on the user computing system; accepting user navigation of and interaction with the visualization; accepting votes for refinement; accumulating user interest information; reforming the visualization; 5) the Interpretation step comprising: adjust their CM MV view by altering the map filters and fxxt formulas; predicting the gestation timeframe of the ttx based on the one of the predetermined plurality of categories or metrics calculated from the ttx characteristics; executing analytics and modeling; reinterpret the CMMDB for an alternative but related purpose; change the CMMDB to use their own labels, cnxpt relationships, fxxts, and filters to provide a custom map for their own interpretation; and 6) the Utilization step comprising use of the ttx visualization for searching; developing product comparisons; displaying modeling results; sharing of searches, tours, etc.; collaboration on consortiums; investing; competitive intelligence; monitoring; use as the basis for derivative or periodic studies; etc.

An embodiment of the invention provides a method and apparatus for managing the lifecycle of a ttx, comprising: receiving data indicating a ttx; categorizing the data indicating the ttx to associate the data with one of a predetermined plurality of categories or a new category; setting access controls for the ttx data, disseminating the ttx data to user computing systems for view and use; accepting extensions, improvements, and refinements of the ttx characteristics; accumulating user interest information; selling or licensing the ttx data.

An embodiment of the invention provides management of a crowd sourcing paradigm for ideation providing teasing out of new innovations into a global common ground to share information; confidentiality in handling of the new ideas; confidential comparison to similar ideas; empowering patent protection; establishing collaborative development; predicting fruition and value; and securitizing innovations, all while language issues are reduced or eliminated by utilizing language independent storage and visualization with a multi-dimensional structure of symbols and diagrams and filters providing for display of language specific information when available.

An embodiment of the invention provides the mechanisms and procedures to create and expand a CMMDB to a number of users in a 'crowd sourcing' construct to conceptualize, or to add, concretize, and refine information about: including but not limited to: tpxs, ttxs, tcepts, and appcepts.

An embodiment of the invention provides a method for providing ttx categorization by consensus clustering within a fxxt, comprising: receiving data indicating a ttx within a fxxt, the data including at least one of a defining of a search goal, a defining of a query, a marking of a place on a visualization derived from the CMMDB, an extension of a ttx, a subdividing of a ttx, a combining of two ttxs to form a convergence, a defining of a new ttx, a stating that a ttx is different from another ttx, a defining of a contradictory feature or requirement for an existing ttx, a coalescing of a ttx into the CMMDB, a stating that a ttx is defined by an information resource, a stating that an information resource is relevant to the definition of a ttx, a showing of interest in a ttx; calculating pairwise ttx identity indicator similarity values within a fxxt, the identity indicator similarities including at least one of: a semantic distance between ttx textual definitions, a semantic distance between ttx descriptions, a semantic distance between ttx names, commonality of occurrence relationships between each ttx and a information resource or relevant entity, commonality of association references between each ttx and a third ttx, a consensus vote toward similarity of the ttx pair, a prior ranking of semantic similarity recognized as generally accurate, or some combination of these; iteratively forming cluster ttxs to indicate a grouping of similar ttxs by a pairwise clustering algorithm utilizing the identity indicator similarity values; and merging, bottom up, the cluster ttxs with pre-existing category ttxs that share the exact same set of member ttxs; converting the remaining cluster ttxs to category ttxs.

An embodiment of the invention provides a method for monetizing ttx categorizations, including: registering at least one ttx category; offering registered ttx categorizations for sale; licensing for use the ttx categorizations and information associated the ttx categorization, granting access and enabling the ttx categorizations to be used by a customer on their local system; selling licenses to access communities associated with registered ttxs, accepting private data to be associated with ttxs, selling private data associated with ttxs, accepting registrations of consortiums formed for collaborative development of ttxs, accepting and processing collaboration and investment transactions involving consortiums, accepting and processing investment transactions involving innovation investment pools.

An embodiment of the invention provides a method for at least one of creation of, naming, specifying a scopx for, listing, voting on, rejecting, linking information to, or describing relationships between the at least two info-items of a field of science; tcept category; tcept; appcept; inventor; patent; product; or roadblock stopping satisfaction of an appcept by a tcept.

An embodiment of the invention provides a method for improving a ttx, including: providing incentives for improving a ttx definition, description, or characteristics; providing a ttx definition system; providing a ttx description system; providing a ttx characteristic change system; and providing community access to the ttx definition system, the ttx description system and the ttx characteristic change system.

An embodiment of the invention provides a method for improving the CMMSYS, including: providing incentives for improving a tpx definition, description, or characteristics; providing an information package requirement description system for stating CMMSYS specifications; providing a tpx definition system; providing a tpx description system; providing a tpx characteristic change system; and providing administrative and developer community access to the information package requirement description system and CMMSYS specifications; tpx definition system, the tpx description system and the tpx characteristic change system.

An embodiment of the invention provides user procedures and a toolset for obtaining one of entertainment, education, personal gratification, esteem for participation in the communities based upon the CMMDB.

An embodiment of the invention provides a method and a toolset for calculating and mining ttx value data from the CMMDB.

An embodiment of the invention provides a method for sharing ttx-based information, including but not limited to: providing related descriptions, analysis articles, identifying at least one of a value, strategy, purpose, application, feature, requirement, roadblock, related to the ttx; sharing visualization experiences including but not limited to: tours taken, visualization viewpoints.

An embodiment of the invention provides a method for customer purchase of at least one of a DataSet, an access right, a registration right, a methodology, an analytic, a model, an execution of a methodology, an execution of an analytic, an execution of a model, a license, a subscription, a CMMSYS component; including: viewing a list of at least one of DataSet packages for a selected ttx element or category, other DataSet package, an access right, a registration right, a methodology, an analytic, a model, an execution, a license, a subscription, a CMMSYS component; and accepting a selecting for purchase at least one DataSet package from the list of DataSet packages.

An embodiment of the invention provides a system configured to manage a customer purchase process, including: an e-commerce catalog module configured to present to a buyer a list of at least one of: DataSet package, an access right, a registration right, a methodology, an analytic, a model, an execution of a methodology, an execution of an analytic, an execution of a model, a license, a subscription, a CMMSYS component, the e-commerce catalog module further configured to receive from a buyer a selection of the at least one of a DataSet package, an access right, a registration right, a methodology, an analytic, a model, an execution of a methodology, an execution of an analytic, an execution of a model, a license, a subscription, a CMMSYS component from the list; a license and access control module coupled to the e-commerce catalog module, the license and access control module configured to limit access to the system to authorized users; a distribution module coupled to the e-commerce catalog module, the distribution module configured to connect with a user system and to provision the user system as needed to install, configure, and grant access to the selected at least one of a DataSet package, an access right, a registration right, a methodology, an analytic, a model, an execution of a methodology, an execution of an analytic, an execution of a model, a license, a subscription, a CMMSYS component.

An embodiment of the invention provides a system configured to share ttx-based analysis, including: a library configured to contain descriptions of tools and application elements, including but not limited to: methodologies, analytics, and models; and a CMMSYS information package catalog linked to the library, the CMMSYS information package catalog containing categorizations for the available elements described in the ttx library and e-commerce functions to enable users to obtain access to the elements for use.

An embodiment of the invention provides a method for alerting in a categorization system, including: notification regarding a change of, including but not limited to: a tpx or its characteristics; a ttx or its characteristics, a specified result from an analytic, the presence of a new developer, provider, or investor.

An embodiment of the invention provides a system configured to provide categorization services to a customer, including: a distribution engine; CMMSYS local system components, and an interface to a customer system, the interface coupled to the distribution engine, the distribution engine configured to distribute, including but not limited to, CMMSYS framework components and CMMDB data sets, the CMMSYS local system components configured to operate on one of a mid-tier server or a workstation, the interface configured to collect data from the customer system, the mid-tier server configured to serve CMMDB data, to manage access, to store and aggregate the collected data, and to release collected data to the central CMMDB, and workstation configured to store and aggregate the collected data, and to release collected data to the mid-tier and central CMMDBs.

An embodiment of the invention provides a method for protecting against full or uncontrolled disclosure of the information held regarding a tpx or ttx, such that only authorized users may obtain controlled information related to the ttx, and the access may be cut off where a license is exceeded or authorization has been terminated.

An embodiment of the invention provides management of a set of communities that each are connected to a ttx of a CMMDB in a specific domain of the owner's choice.

An embodiment of the invention provides methods for initiating and adding community information connected with a ttx, including: facilities for narrow topic chats, blogs, advertisements by nature of transaction desired, discussion forums, meeting, conversation, online-discussion, conference, or other event information, tokens for use to gain access to meetings or other events or to obtain discounts, articles, search scripts, search retrieval results, navigation tours, bookmarks or links to other information, information, information available for purchase or subscription, surveys, contact lists, personal profiles, inventor/conjurer information, development consortium information, and access rights and management information for each of the community facilities.

An embodiment of the invention provides a method to at least one of become developer, become publisher, become customer, become member, advertise, offer, search for, sell, select, purchase, register, distribute, offer for download, request, opt-in for, offer access to, sell access to, grant access to, join, or publish the at least one of the new, enhanced, improved, corrected, or revised at least one of portal function, body of information, subscription, DataSet, or access right.

An embodiment of the invention provides a method to incentivize use by users by at least one of offering awards, membership in a community, access rights, right to own, right to advertise, information, on-line personality/presence, discounts, prizes, recognition as at least one of expert, being creative, added knowledge, provided editing, made significant leap in invention; inclusion by at least one of a developer; a contributor; a publisher; a member of a development consortium; a member of a special group of achievers.

An embodiment of the invention provides a system configured to distribute ttx categorizations in a network, the system including a framework, the framework configured to distribute CMMDB information packages and included tpx and ttx information with restricted use IDs, to configure and control access, and to collect tpx and ttx data, imports, and categorization data from the network.

An embodiment of the invention provides a method for registering a CMMSYS information package, including: registering as a user on a portal to the system; provisioning the CMMSYS information package; establishing access; connecting to a CMMDB; and accessing and collaboratively improving the CMMDB, portal tools enabling the user to access tpx and ttx information and to submit tpxs, ttxs, and descriptive information to the CMMDB, and tools enabling administrators and developers to improve the CMMSYS.

An embodiment of the invention provides a method for managing a CMMSYS information package lifecycle, including: stating a requirement for the package, developing the package, certifying the package, distributing the package during provisioning, licensing the use of the package, registering the package, configuring the package, authorizing the package for use, granting access to the package, providing access to the package, terminating access to the package, terminating the license for the package, terminating the registration for the package, reconfiguring the package, re-provisioning the package by update.

An embodiment of the invention provides a method for managing a consortium for collaborative ttx development, preparing and submitting patent applications, forming a business, accepting or offering investment, including but not limited to: providing a consortium member exchange; coordinating member to candidate communications for negotiations for joining the consortium, registering members into the collaborative, managing secure storage of consortium documentation and tracking contributions, coordinating member to investor communications for negotiations for funding the consortium, registering members into the collaborative, collecting and distributing investment funds, and providing a contribution submission tool.

An embodiment of the invention provides a method for managing a collaborative development process, including: providing a developer exchange Website; registering a developer on the exchange Website; and providing information package submission tools via the exchange Website.

An embodiment of the invention provides a system and method for managing the rapid application for patents suitable in a first to file patent system, consisting of: ideation; methodology based completion of the minimum necessary for patent application; online collaboration mechanism for assisted preparation of an application; preparation for electronic patent application; assistance for electronically filing the application; electronic application and payment mechanism and process; online auction mechanism and process for licensing and assignment of patent rights; online investment mechanism and process for funding invention and for funding development; online option investment mechanism and process for funding invention and for securing future patent rights; and online intellectual property portfolio management.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

Figure 1:
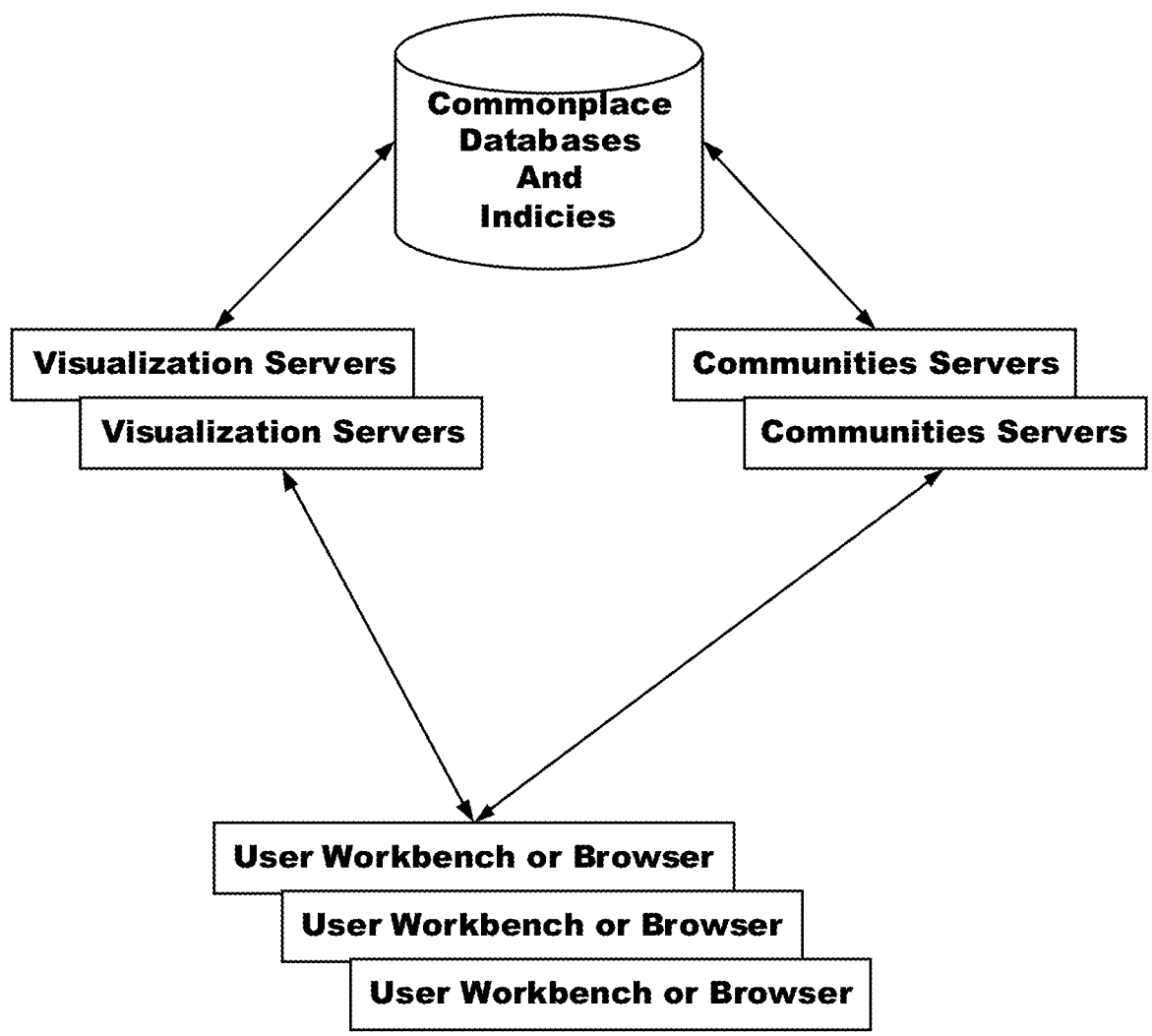
FIG. 1 is a block diagram of a system architecture, according to an embodiment of the invention.
Figure 2:
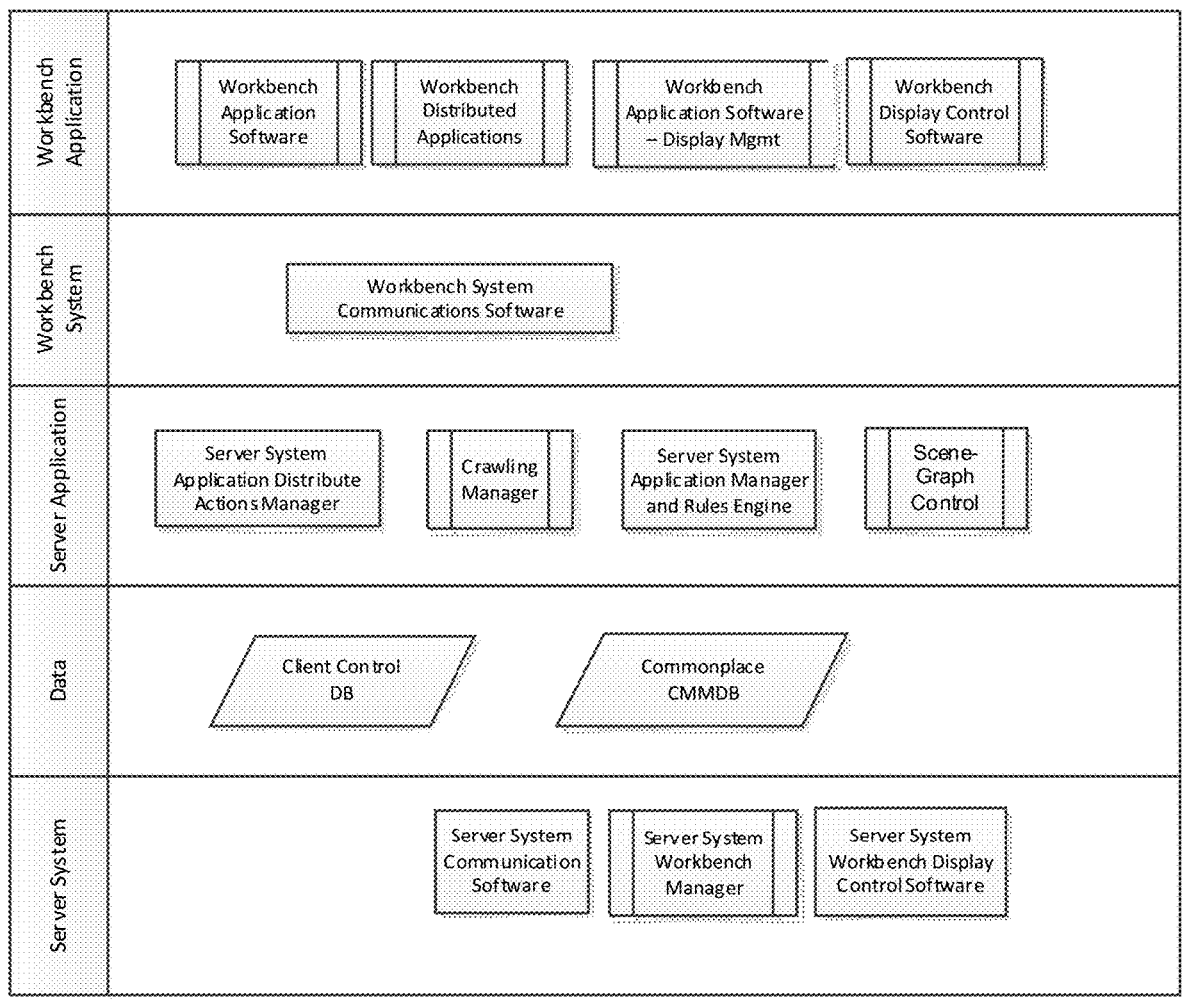
FIG. 2 is a block diagram of a functional architecture, according to an embodiment of the invention.
Figure 3:
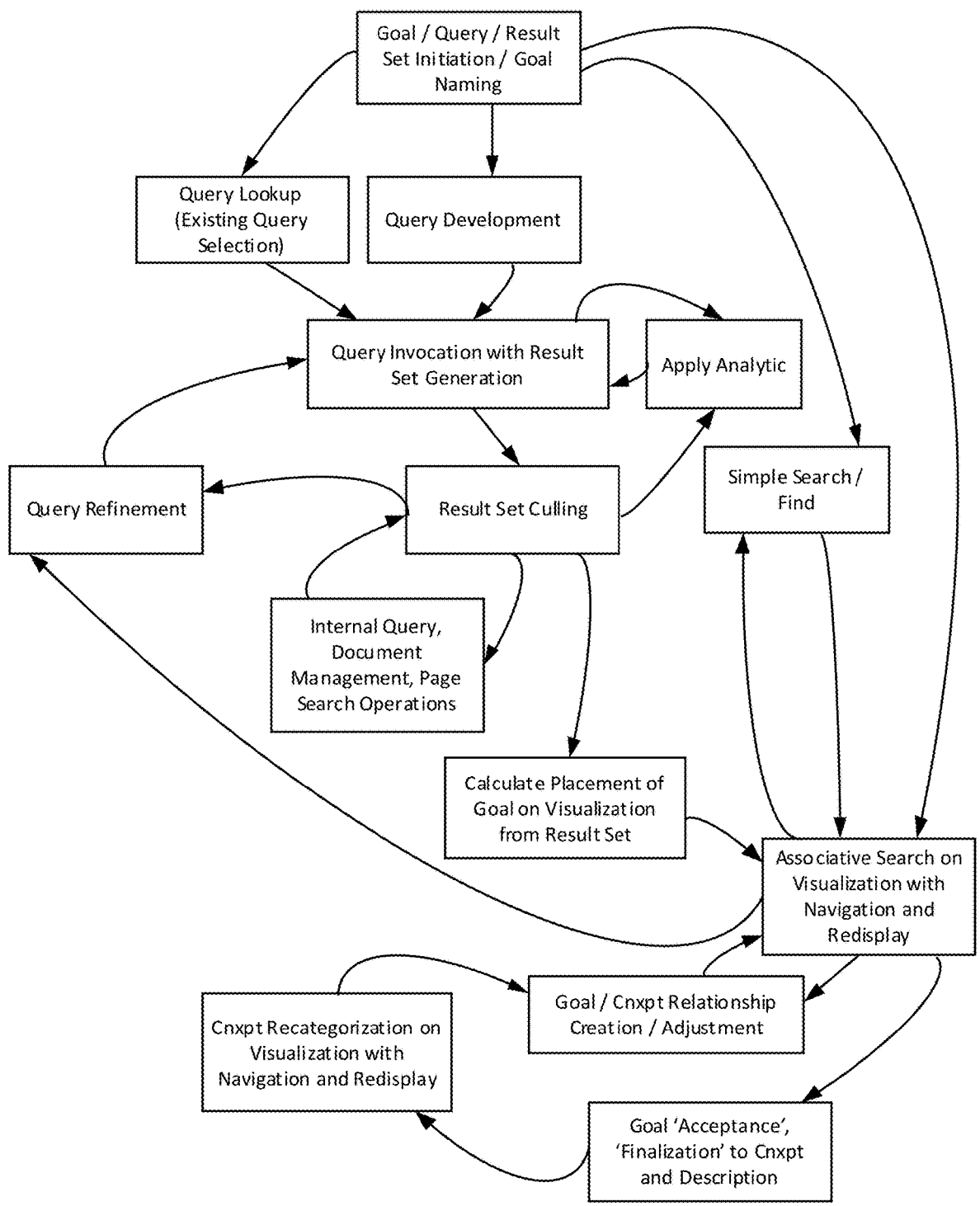
FIG. 3 is a block diagram of the query and conjure process, according to an embodiment of the invention.
Figure 4:
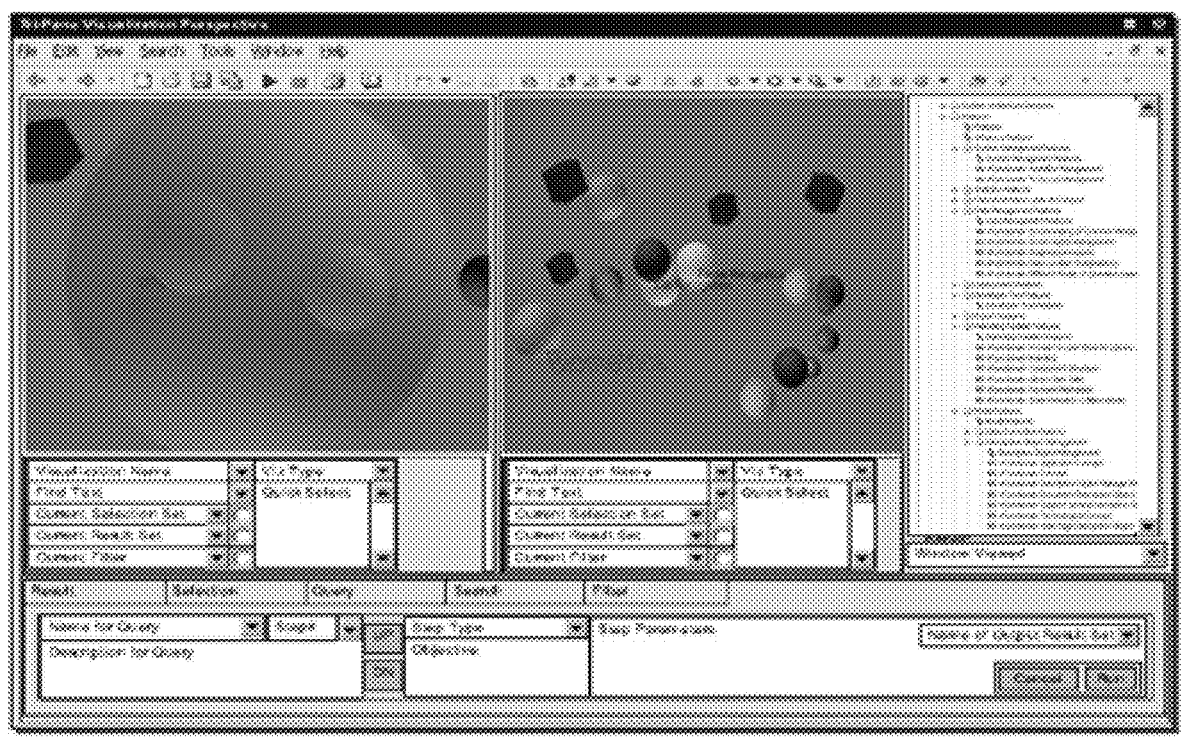
FIG. 4 is a workbench user interface view showing the visualizations and maps for navigation, according to an embodiment of the invention.
Figure 5:
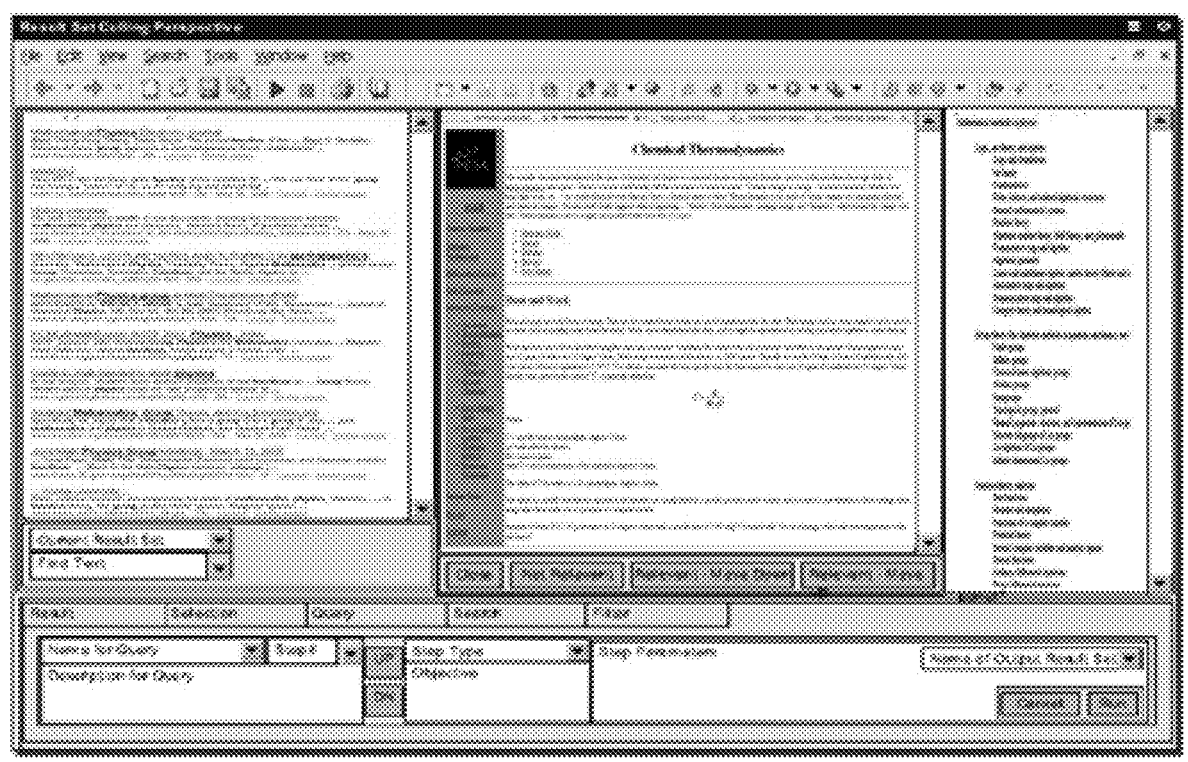
FIG. 5 is a workbench user interface view showing culling views, according to an embodiment of the invention.

The invention is directed to an improved information creativity, collection, categorization, and retrieval lifecycle, a functional architecture (also described hereinafter as a framework), and improved methods for providing network-based creativity, ttx collection, categorization, retrieval, and exploitation. Embodiments of the invention provide general tools for creativity, categorizing, virtual mapping, visualization, search, and retrieval of ttxs and its extensions for web communities and analytics. Embodiments of the invention also provide a specialization of the general tools directed to technology innovation, creativity, and categorizations, as well as the procedures for manipulating categorizations and use of the tools, technical information categorization and retrieval controls, and business processes for incentivization and fee collection.

Sub-headings are used below for organizational convenience, but do not necessarily limit the disclosure of any particular feature to any particular section of this specification. An improved information categorization and retrieval lifecycle including the process flows involved is presented first, followed by the tool descriptions and the related process flows. The Functional Architecture is presented after the lifecycle, tools, and process flows.

Observations: Advantages and Disadvantages

One use of creativity is in technology innovation. One use of creativity is in legal argument, resulting in development of law.

Creativity

There is a need to better organize for and incentivize creativity and innovation. This creativity begins with the general case of 'new idea' to be collected and categorized, but extends to: by way of example, technology innovation and entrepreneurship. The need extends to incentivizing entrepreneurs to start businesses based upon needed technologies and for technical people to be incentivized to work on clearing the roadblocks to use of technologies. There is an additional need to improve the capturing and use of creativity and the reusability of innovation workers' results, and to otherwise use the information collected for more efficient and effective innovation. There is a need to provide continuous quality improvement of ideas and an iterative process that yields a continuous flow of new ideas and improvements for predictions.

There is a need to reuse the efforts of others over time, incorporating and improving other's understanding of relationships among tcepts, their purlieu timeframes or contexts, and their cncpttrrts. As an example, competitive strategists draw a breakdown diagram of the field they are studying, and summarize their research on the basis of the diagram, resulting in a paper based but reusable understanding of the relationships between technology application domains and players. There is a need is to make this structure available and efficient for users, so that understanding of the knowledge is progressive and the amount of work required of each individual user is small.

There is a need to foster innovation within society and within companies. This need extends to more effective collective development of innovations. Sharing of innovation globally or within a project or company, coupled with protections and collective development, is needed.

Legal Clarity

There is a need to decrease an inventors time to file for patent protection. The economic benefit of immediately filing has changed dramatically through reduced cost to file and reduced burden on best mode and possibility of non-public inventorship.

There is a need to improve the common understanding of the issues and ttxs as recorded by others in legal documents, research papers, and more generally. People around the world have different opinions on definitions of a ttx, and what categorization it should fall under. The difference increases over time partly due to generalization chauvinism theory—since people judge past eras by present standards. For example: When someone said the word 'pipes' (referring to the instrument used as a medium of transportation), it was defined as lead pipes two decades ago, concrete pipes a decade ago, and Carbon nano-tubes in today's world.

There is a need to show ttxs and issues side by side other sources regarding similar ttxs, and products offering these classification indices must be improved to become more dynamically organized to improve efficiency. Examples of such systems abound, including the Shepard's system, Lexis and Westlaw, all of the various patent research systems. Google performs this function with loosened constraints and poorer results for a wider market of topics, but none of these systems offer all that is needed by a researcher who must work effectively, retain and update his work effortlessly, combine the results needed from several sources, and spend less to get the satisfactory result sought. Legal analysis could be built on the shoulders of what others considered rather than merely on their results in court opinions. The strength of an argument could be predicted where prior success at use of a position could be measured, but it can also be predicted by an attorney considered and rejected its use, given a similar fact pattern.

Sharing of Creative Results

There is a need to answer the currently existing demand for technology by uncovering the available technologies isolated in the mind of any of the thousands of potential inventors now unable to find the appropriate means to get an idea into the reach of those able to make use of it.

There is a need to improve the current burdensome common ground for inventors, technology seekers, and technology holders called the patent system. Efficiency demands allowing these groups to come together and share their knowledge, their problems and their potential solutions to avoid replication of technology invention and solve the chaos created due to disorganization existing in today's world.

There is an additional need to variously balance or reconcile the ease of global sharing of knowledge and the cost of exposing valuable Intellectual Property (utility patents or other secrets). Owners of IP need to know what is known by others about technologies they own. They also need access to technologies that surpass their own to solve larger appcepts as is seen within make or buy studies.

There is a need to incentivize and award creativity and thus to protect the new ttxs as they are shaped into marketable products and services. Team formation and investment must occur within the parameters of these protections, but must occur.

There is thus a need to move ideas from those who have them to those who can generate higher value from them. To do so, this need demands that the ideas have to be collected, managed, organized, made retrievable, made useful for valuation and analysis, and, set to be the anchoring point to which new material can be related in a cognitive structure.

Conveying Technologies

There is an additional need to empower meaningful learning. "Meaningful learning results when new information is acquired by deliberate effort on the part of the learner to connect the new information with relevant, preexisting topics or propositions in the learner's own cognitive structure." Ausubel. Here, meaningful learning involves the assimilation of new ttxs and propositions into existing cognitive structures.

There is an additional need to empower serendipitous learning to make it fun to learn of ttxs that a user had previously not studied or known about through browsing within ttx categories (subject areas) and frequently discovering resources that are tangentially related to known ttxs. This need is not adequately addressed by today's online resources or by search engines like Google, even though the ability widely enjoyed.

There is an additional need to provide the mental excitement as would occur in game program to keep the speed of learning high. Incremental explorative browsing should be provided alongside other techniques to look for something specific, such as performing a search to get to the area showing the required information.

Information Management Tools

There is a need for improvement in technology information management, a broad field today hobbled by a lack of effective tools and proper incentives. In the past, technology information categorization and retrieval meant prior art searching at the patent office, a competitive intelligence study, or a technology road mapping project at a product company. Each of these ad hoc exercises consistently result in one time reports that become stale rapidly. The infrastructure for the studies—the queries and intermediate results—are usually lost soon after the report is written, and have to be recreated when the inevitable need for a repeat of the effort occurs.

There is a need for users to decrease their costs for legal research and patent searching. For law, the present Shepard's system, while widely used, is costly yet restricted in abilities relative to what is possible today with dynamic indexing and refinement, akin to but beyond Google's systems.

There is a need for professionals to become proactive in using and managing intellectual property as the need for rapid innovation and more efficient utilization of resources increases, and the amazing amount of information becoming available and the new paradigms of work such as open source expand. For instance, prior art searching must be more efficient than ever because of the extreme waste of resources spent on reinvention and poor utilization of the knowledge of others.

Another need is in environmental scanning within competitive intelligence. Management is driven to see farther out strategically and they often realize how ineffective their tools and organizations are when they are blind-sided by a competitor from another part of the world or another industry.

The rise of data mining and investment vehicles and products improves the market for new analytic and investment products.

The disintermediation of investing and teaming, allowing ventures to form online and be invested in directly establishes a need for vetting, effort management, investment portfolio management, pooled investments, and communities online for entities seeking investment, etc.

Name and Relationship Based Information Management Tools

There is a need to provide deeper classification. Experts are held back when only superficial descriptions of ttxs are available, meant only for the novice. Novices need to start at a general level and progress toward detail only to the degree they must based upon their task. Experts need to be concerned about the future, while investors need to be concerned about the timing of invention, inventors need to know about the details of prior art, and competitive analysts need detailed information about very specific topics. Novices need little of these, but want to find out whether an idea they have considered may have been invented already. What is needed is a tool to mitigate the differentials in understanding levels between experts and novices while addressing the needs of each, and managing the authority and quality issues related to dynamic classification complexity.

A missing element from traditional information categorization and retrieval product solutions is the equivalent of a personal command and control system (a 'Dashboard') coordinated with a consistent management system and database. The command and control system would have to connect the point solution results to a user's view of the CMM when appropriate to achieve consistency, harmonization, and traceability.

There is a need to reduce redundancy and provide authority control in the presence of multiple manifestations—ttxs that are identical in meaning but have different names, names in different languages, misspelled names, or different explanations that are equivalent. Among normal textual works, this problem is relatively small, but not so where the system is ideation centric.

There is a need to name ttx categories in an automated categorization process, such as in clustering, and a need to name ttxs where they are collected automatically as occurs in scraping. When such ttxs are entered into the system automatically, a name should be created for ease of user understanding of visualizations. Keywords are a limiting mechanism and as newer ideas are generated, the ability of keyword lists for use as differentiators decreases. In addition, because the human vocabulary is limited, similar words are often used to name different ttxs even if user entered. People simply cannot generate new words quickly enough and need to rely on existing language to explain new ttxs.

Human input is often the only possible method for correcting such naming to obtain unique names, and even so, it is sometimes unrealistic to expect that uniqueness is possible. There is a need for some ability to improve understandability and adherence to explicit or implicit naming conventions.

There is a need to reduce the burden of choosing ttx names, now a critical activity for the user. In many present systems, naming a ttx has been left to the user who had to choose a unique name and generally stick with it to establish and maintain the 'authorities'. Unique naming has also been required because references are made to the ttx using that name, and since names were tightly connected to the implementation of the system and were 'sufficient' item identifiers, as well as identity indicators, for ttxs. This has had several consequences:

In order to prevent confusion, the user had to: 1) be consistent with existing naming conventions; 2) avoid names already used, and 3) anticipate the addition of other ttxs with similar names.

The user often could not choose names that mirrored those in natural language. Where a natural language name has several meanings, the user was forced to invent a new name. Where several natural language names were synonyms for the same thing, the user had to choose among them.

The user was often not able to utilize synonyms and homonyms, which occur frequently.

There is a need to edit relationships in databases. Databases with deep relationship chains, deep taxonomies, and ontologies are in greater use as more information objects are managed. Some applications, such as intelligence, law, internet, or intellectual property, continuously grow in chain or classification depth. No tool currently provides an ability to efficiently edit an ontology visually. No ability exists for viewing or editing by fxxts, or for viewing with information hiding. Ontologies are little used because, in part, practitioners have little recognition of or means to provide incentives toward use, and thus few incentives for refining or entering new information into the ontology are put into practice. Often, the objects involved in these chains are of interest by specific communities, and online communities centered on the object could be helpful to increase communication efficiency for the interest group.

What is needed is a tool to mitigate the authority and quality issues related to naming and relationship complexity.

What is needed is a tool that is effective enough to provide answers, offer initial values, and also to become the tool for cleanup. Users not obtaining good results for their needs will not be willing to clean up their data or the data from others. The answers must be effective, while possibly imperfect, even where the data is 'fuzzy' and ttx meanings are poorly constructed. The tool must be helpful but not overbearing, providing assistance to reduce user burden and making mere suggestions for improvement rather than denying progress where, for example, a value such as a name is not entered. The cleanup should support, including but not limited to: fix errant data; complete entries; improve understandability; assign best names; clarify description to remove ambiguities; obtain translations; fix grammar; enforce adherence to civility in discussion; enforce adherence to naming conventions and use of authorities; or approve use of suggested synonyms, translations, and homonyms. Each such cleanup need must cause an editorial workflow item to be entered suggesting that a review is needed. A user's prior use forms a context they are familiar with, and thus old names must remain with the named entities for historic purposes.

Currency of Technology Description

Currency is the up-to-datedness of information provided from a repository.

To provide currency, a system must be updated, and the data held in it must be improved.

Categorization Services

Known categorization services provide slowly changing and superficial categorization indices. While technologies, led by the Internet, have increasingly allowed for the easy sharing of knowledge and valuable IP, the information for categorization has been lacking, causing wild attempts at 'semantic web' and other research. Companies, such as Derwent, have developed tools aimed at helping IP owners manage their own property (embodied in patents and copyrights), by providing a software solution that allows them to categorize their property with that of others, but these are costly, not dynamic, and limited as well.

Known methods provide inadequate business models for ttx creativity in general, but also where utilizing categorization services. Such services fail to provide modern techniques for analyzing the ttxs, extending the value of the categorizations provided, or providing infrastructure around the ttxs.

There is a commercial need to maximize the value of the information in the CMM, and to be competitive. This need can be met if the information contained is the best available. To achieve data supremacy, users must be incentivized to enter as many new tcepts and appcepts as possible, and to clean up as much database information as possible. Thus an additional need is to provide sufficient value to users to get them to use the system so that they will add or refine information in the database.

There is a commercial need to add incentives to connect in other data and opportunities and to catch user interaction with the data to show user interests, because the value of the data is multiplied by data mining, and for determining the health of innovation.

There is a need for greater ease of use of categorization services and tools. Their present limited audience and purpose has caused them to be tuned for limited purposes and to be tedious for use outside of IP management, further limiting their utility.

In one respect, known methods for procuring categorization services and data provide little or no effective harmonization between new locally defined ttx categorizations and newly defined ttxs from the central data store or even with new locally defined ttx categorizations at another user location. Thus, it falls to the buyer of such services or data to ensure that the categorizations and object definitions in their local system are reconciled with those of a central standard or with other buyer's local systems.

In another example, known methods provide inadequate business models for traceability and version control over changes made in central data stores (vendor's or private) and local systems that might be managed by users and might contain data not privy to the categorization service vendor Again, it falls to the user of such services to ensure that the data is valid and up-to-date.

In addition, known systems and methods fail to take into account the full lifecycle of creativity, of categorization delivery, or of categorization refinement and reuse, or to coordinate the information needed for process improvement. For example, known systems do not sufficiently provide a cost-effective way to update categorizations based on changing categorization information from other users.

Also, known tools aimed at helping Intellectual Property owners manage their own property provide solutions that allow them to categorize their property with that of others, but the categorization structures fail to recognize the complexity of the need. The insufficient tools cannot effectively serve product departments more generally causing both unnecessary infringement and wasteful reinvention.

There is an additional need to extend deeper the level of categorization of technologies. Current approaches require the user to develop the queries and filters needed to establish the membership of a particular category below the categories provided or where information needed is classified in multiple categories as defined by the categorization vendor. This constrains the sharing of the knowledge and forces inefficiency.

What is needed is a system and a technique for managing the various categorizations in their various fxxts, enabling an architecture of participation around categorization.

What is needed is a more robust system and method for managing categorization services, including the improved creativity methods, business methods, functional architecture, and lifecycle management processes associated with such management.

In addition, known systems and methods fail to address the vertical markets or the horizontal markets where the needs exist, notably from their inability to provide the generality needed for extension of purpose beyond basic search and retrieval. The competition now, in most vertical markets, is the spreadsheet or a word processing document, leading to a vast under-utilization of prior work.

What is also needed is an improved txo-based information categorization and retrieval management paradigm to deal with a multi-source environment with few standards, providing streamlined methods for incentivized creation of new knowledge; retrieval and inclusion of current knowledge; incentivized refinement of stored knowledge; efficient access, reuse, sharing, and distribution of the stored knowledge; and management of the studies that require all of these. The need is not for unassembled pieces but a working combination. This often involves 'harmonization' of topic indexes from various sources. A need exists for a generalized specification language for scripting the process of finding an index taxonomy from an ontology in a way that ensures that the best structure for the resulting taxonomy.

Search and Retrieval

There is a need to greatly improve searching of highly categorized ttxs. Failure to provide effective searching leads to superficial searching and unnecessary culling of results. By way of example, the field of Prior Art Searching has limited and costly facilities for accurately finding prior art, and the effect is that the cost of each search is high and that results are poor. This leads inventors to forego searches, to spend large sums on fruitless patent prosecution, to claim excessively on patent applications, etc. Patent offices are hard pressed to maintain performance as well. Lack of good quality searches leads to major costs for all concerned as patents are issued and must then be defended against similar technologies.

Similar searches are often performed repetitively when the community as a whole is considered. Often the information sought has been lost due to poor cataloging or categorization when the search is first attempted, or has become stale due to passing of time.

As the quantity of information available on the Internet grows, it is becoming more and more important to provide more advanced search and retrieval capabilities. Keyword indexing, thesauri, meta-searching, and taxonomies alone are proving inadequate in providing a search system that permits a user to effectively locate and access the best available information on the internet and in their organizations.

There is a need for expansive searching, tying information from disparate sources into the result. Present search engines such as Google provide limited sourcing, including local files, corporate knowledge bases, Google knowledge bases, and internet searches. Even this wide set is limited, failing to provide for searches of fee sources and deep web data.

There is a need to better manage returned results of searches. The output of data from Google is in form of links that the user may cull. These links are not easily reusable. The links are not easily retained in a sorted list by search query and are not retained by topic. Multi-step queries are not available in some search facilities.

Most available content is unstructured so that it is difficult to locate pertinent data. The volume of information available has grown tremendously. Elementary search engines are becoming increasingly ineffective in identifying relevant information. There is a growing need for more effective search systems.

There is an additional need to provide a search system that can be used to perform a search across many heterogeneous information retrieval systems. It is desirable to provide a search system that can index and catalogue information stored in many different formats on different websites, permitting users to perform a smaller number of searches through a single web portal to achieve a wide search goal on several sites and to obtain disaggregated data in addition to documents. Providing a user the ability to penetrate the content of some sites by more sophisticated searching techniques or by use of an account while at the same time searching other simpler engines would greatly speed the overall search effort.

There is an additional need to provide a system for performing automated cataloging and indexing of information resources. Prior art systems need a system that uses a stronger classification system to assist in finding data by keywords, thesauri, translated keywords, citations, and the assigned broad classifications. The system should utilize internet meta-search techniques to find and index information resources not previously indexed, but also search internal data stores and indexed information resources. Information resources should be ranked by relevance to a specific ttx by the meta-search facility, internal analytics, and with the aid of the user to permit more effective search and retrieval of information and reuse of the newly gained knowledge.

There is an additional need to provide a system for performing search and categorization for rapidly finding tcepts or appcepts. The categories must be in structured lists of fields of study, tcepts, and appcepts, provided by relationships, but it must also be fluid to support categorization not fixed by relations in the database.

There is an additional need to provide content and categorization currency or the users will not find the tool useful over time. The content and categorization should be the 'best available' or it will be seen as stale. Still, it must retain and show the effect of what the user changes to respect their subjective opinion and give proper results.

An additional need is that the returned results must be managed for a user during the query process and as a record of the query for reference later. These 'scan hits' are cumulatively important but are also in need of refreshing and any ability to rerun the query and notify the user of new information would be important to a user.

Even if the forgoing needs are addressed, there is an additional need to present the information in a way that users may be educated, may remember context, and may search associatively (by co-location).

Prediction

The need for currency does not stop at the present. Professionals plan ahead and need to share the information at least internal to their organization Individuals want to see ttxs before they are real. Inventors want to know what ideas others have disclosed, not just which ones have been realized into a product. This need is the bridging of the abstract and reality.

There is an additional need to provide worthwhile assessments of value and importance of tcepts. The average accuracy of these assessments is a measure of collected intelligence, an objective opinion of the crowd or a segment. The difficulty is best illustrated by the frustration most people experience with committees and meetings where the result is rarely much better than the result from where the different participants had tackled the problem individually.

Although committees are obviously important and useful, in practice it appears difficult for them to realize their full potential They fail to organize and they disband rapidly. At the same time, they do yield what may be called the 'best available' information and predictions because of the consensus reached. Small groups and other outliers may and often do believe that they can do better than the public in general, and they are too often correct to be ignored.

There is an additional need to raise the collective intelligence by speeding the evaluations of opinions, and to increase the efficiency of sharing the alternatives.

There is a need to present technologies from varying points of view. As examples, technologies must be seen with their antecedents for prior art, with their contemporaries for competitive intelligence and product assessment, along side yet to be developed technologies for looking ahead, by ownership, by application, and by importance. The need for mapping by these fxxts is needed for associative searching, to communicate current reality, and to stir imagination.

There is an additional need to provide prediction management so that the estimates of users about when some tcept may become real, and what value the reality will have can be stored, assessed, reconsidered, and totaled to obtain the 'best available' guess about the future. Predictions of outcomes, based upon modeling rules for, as examples, market share, investment, risk, competitive position, etc. are a needed additional facility for business decisions and gaming analysis.

An additional need to improve the efficiency of searching is apparent. In one aspect of searching, the number of queries needed to find the proper collection of information for a study could better be reduced. In another aspect, the results of a study involving many queries could be reused, at least as a basis, or at least by sharing the queries.

Collaboration

There is an additional need to enable effective collaboration. Collaboration in tcept categorization and description already exists widely in the patent system and in research. There many, many experts already involved are not working together well. Every company, every professional organization, every government department, every inventor, and every scientist has some form of categorization scheme and description tool that they use for their own work, but these and the content are almost never shared consistently at any more than a superficial level. This is strikingly obvious when an engineer has to learn something about an unfamiliar tcept and cannot find the experts or the prior work.

The collaboration of various parties in a study, even if unaware, could serve to improve the results for one or more of the group. Naturally, many users will be experts in what they are studying. However, few can know more about a particular topic than the sum of his or her colleagues. Having the additional benefit of outsider information, if handled properly, only improves results. This presents a new need, to provide a mechanism to weigh the opinions and results of collaborators.

The additional need exists to add the assessment of different experts on different fxxts of categorization content to provide better quality in the content and categorizations as the number of fxxts grow. Improvement of data is obviously important. Once new ttxs are entered, they must be examined by someone to determine if they are well-formed and meaningful. No limit exists on the number of poorly formed ideas that could be entered into a ttx system, and so the number of editors needed is very high. Perfection is out of the question because this form of knowledge changes rapidly.

The additional need exists to incentivize users to perform cleanup. The objective to be achieved is acceptability of information AFTER some cleanup. Impediments to use or to clean up must be reduced.

There is also a need to manage ownership interests both in the existing and newly contributed information.

List, Taxonomy, Ontology Comparison, Integration, Harmonization

Few solutions exist for the realistic management of lists, taxonomies, and ontologies to allow operations such as comparison, combination, and differencing on the basis of factors used to limit and organize the data (such as categories, strengths of relationships, etc.); integration by complex equation and factors including the differencing and comparison operations; or harmonization where the combination depends upon very complex factors including personal opinions and voting regarding the naming, relationship strengths, categorizations, rationale for classifications, etc. Few provide those functions for collaboration among thousands of users over thousands of list items and over extended timeframes. Yet all of these abilities are possible and achieved here.

List, Taxonomy, Ontology Statistical Analysis and Modeling

The ability to build models communally is not readily available today. Models based upon lists, taxonomies, and ontologies are possible with the techniques and infrastructure here, because of the combination of relationship based formulas which affect the strengths used in categorization and importance strengths and the other factors here, including the combination and differencing above resulting in fxxt level formulas and multi-level heuristic application. Clustering algorithms are applicable to generate relationship strengths to obtain initial relationship discovery from unstructured data as well as, including but not limited to: determination of similarity of classifications based upon overall opinions on approximately the same base set of data; determination of similarity of classifications resulting from different fxxt specification calculations on approximately the same base set; determination of the similarity of internally held ideas (thoughts in the mind of users) based upon various classifications (children of parents) and characteristics data (cnxpt identifiers).

Communities and Ecosystems and Narrow Networking

There is a need to connect people through and centered upon ttxs. Social networks are not focused upon problem solution or are purposely constructed to serve an audience for a general rather than a very specific topic. Rapid social networking between those interested in a narrow topic will incentivize communication because the efficiency of communication about the topic with other experts is higher than when experts are forced to discuss the topic widely with those less well trained or less interested in the specific topic.

There is a need to provide the ttxs, as an authority control file resource, an information utility, and as a classification structure, to others for use on a dynamic mash-up basis or for use by them to organize content on their system or web site, statically or dynamically.

Audience Segmentation

There is a need to address people based upon ttxs. To serve a specific audience to achieve a sales objective based upon a product or service that is specific to a technology requires collection and maintenance of the interests of the people. Social networking rarely provides the incentive for maintenance of such lists, making their value low. A technology list (classification structure) that rapidly improves and is maintained, along with the incentive provided to those using it is needed. Events or meetings, discussions, teaming, networking, and other ecosystem mechanisms are all in need of audience selection, and where they are associated with technologies, then the classification structure is needed.

Methodologies and Study Management

An additional need to improve the efficiency of the sophisticated studies that professionals in intellectual property and product management perform prescribes better multi-stage query, study management, and collaboration tools. Also, there is a need to impart best practices and sophisticated methods to those who have an immediate need and a general lack of resources to pay for service providers. The delivery of those methodologies to a specific user in a measured fashion and allowing self-help, work management, and any eventual recognition of a need for professional assistance and the coincident customer qualification all show a need for methodology attachment and delivery to users in a managed and measured process.

In specific market segments, where professionals must utilize deeper content and delay is costly, the importance of sophistication in many elements of the search, retrieve, evaluate, and refine cycle interact and compound.

State of Innovation

There is a need to obtain metrics on innovation both within a company and nationally. We don't know how well we are managing the innovation process except by a simplistic R&D and Patent processing metrics. We feel uneasy about our success rate, and yet cannot easily justify spending on improvements.

There is a need to properly describe an 'ideal'—a specific state of technologies at some future point. We cannot predict the 'distance' to it, measure our rate of achievement against it, or show areas where the quality of our attempts is good or bad. We have no Map giving a destination or distances. We do not know if we make good use of our collective intellect because we do not know what we are thinking or what is possible. We do not know what a good direction is for the longer term. Our employees are consistently under-utilized in innovation. We cannot easily find technology we need, or the experts in it, etc. We cannot determine easily what specific technologies to invest in. We don't know how well we manage, execute, innovate, or invest.

Employment

There is a need to better manage human resources. Today, the common internet job boards are constructed around needed technology skills on a superficial, vague level. When searching for a job, a candidate first must suffer through a long list of vague job descriptions, then must answer many more than possibly needed where they might have a special skill needed but not well called for in the descriptions. A candidates chance on a job posting is considerably decreased largely because of the lack of a tcept based job board. Further, where a candidate is known by others who show there expertise relative to a tcept, or participate in communities related to tcept, knowledge by others of their skills could be significantly increased.

Response

Recently however, many new technologies have enabled the solution. A CMM offering a structured 'best available' understanding of an area of knowledge, limited in scope, can now be built to serve as a commonplace. A graphical interface aligned with a query facility can bring efficient and reusable mapping to users. Content will improve if incentives are available to users who focus on incrementally defining new tcepts or new appcepts. Content will improve if an ecosystem for the users of a tcept offers community website structures specific to the tcept.

A database that is the best available source for a list of tcepts and appcepts provides significant value from the accumulated CMM information. Tcepts gain liquidity because a market is created where the tcepts can be licensed and sold. Tcept and appcept data also gains value and can be used, licensed, or sold. The holder/owner of the database can extract value from that accumulated CMM information and the interest information from use. Also, users can be offered access to that value for a fee. An ability to allow users ownership and control of their search results is valuable.

A visualization display showing ttxs that are very similar in close proximity provides at least a visual clue to users that the similarity exists. Collocation (a more precise matching) by self-organizing mapping is useful to essentially combine ttxs by apparent similarity. The CMM is more permanently improved by automated merging and categorization, and a user ability to note that two ttxs are so similar that they really should be considered to be in the same category or that they should be the same by combining them.

Such a commonplace can provide prior art searching, competitive environmental scanning, competitive analysis study repository management and reuse, innovation gap analysis identification, novelty checking, technology prediction, investment area assessment and planning, and product comparison and feature planning.

The answer to gaining a common understanding and a common categorization of technology that can be as fluid as the real world, be as current as needed, and still support a substantial set of the needs of intellectual property managers, product managers, and inventors is to use a form of computer assisted and internet assisted Delphi technique in combination with the commonplace and a wiki like system to obtain the deep classification as well as the roll-up needed to provide users the information needed, and to provide the breadth that the real world set of users require.

Early and efficient capture of users' imagination into an accurate structure of the commonplace will empower the most imaginative/expert users in specific areas of technology to efficiently create in the most detailed categories—the fringe areas or the most futuristic ttxs. Early capture maximizes the currency of the categorization. Improving the authority or quality of the information held by proper consensus will ensure the CMM's 'best available' status.

The answer to better innovation metrics lies in statistical measurement based upon the newness of a technological category and its parentage can provide rate of change metrics by technology area on a disaggregated basis.

The answer to improved job search is placement of job availability notices connected to one or more specific tcepts relevant to the job. In addition, use of the collaboration and community structures connected with a specific tcept, if available, would serve to improve the chance that a person involved with a tcept would know and be known sufficiently to connect for the job.

The answer to these needs is a search and categorization tool useful for rapidly concretizing, categorizing, and finding ttxs, tcepts or appcepts. The user views the structure of the underlying data from various points of view using visualizations of Maps, in one embodiment akin to video game displays. Each of the several available Maps is based upon data and the relationships of many varieties stored in the CMMDB ontology. A Map is produced by an analysis of these relationships in the CMM and thus have a structure based upon the typing, scopxing, and fxxt analysis used.

Along the lines of tallying votes about how to organize the map and the underlying index it is based upon, this system interprets a user's 'fxxt specification' to find an index taxonomy from an ontology in a way that ensures that the best structure for the taxonomy results. The taxonomy is then used to form the map.

Searching is like playing charades. A search engine as described here attempts to find what a person is trying to describe, from what they can 'verbalize', about the thought they have. When a person tells the search engine what s/he is searching for, s/he is acting in ways meant to convey their 'charade idea'—a concept hidden in their mind That idea is not necessarily being simply described in words directly into the search engine, but rather through this set of acts such as keyword/phrase searching and document relevance culling, 'survey' question answering, focusing selection display and serendipitous discovery of possible ways to classify the thought, search goal 'avatar' repositioning, technology combination, stating that an application is being solved, stating the traits of the concept, etc., all placed/combined into multiple 'action' or 'step' discussions with the search engine, possibly over a very extended timeframe, and sometimes involving more than one person (sometimes many) into the 'collaborative' search process. Collecting and using all of these combined indicators effectively to 'understand' the concept being searched for is the base technical purpose of the search engine, but the building of the knowledge base from it for later reuse is the key to effectiveness in crowd sourcing.

Data Collection and Collective Creativity

The base of data described above will surely be in need of 'maintenance'. The categories established by the patents and prior art documentation may not be precise. Not all of the ttxs found will be real or meaningful ttxs. The categories will not always be cohesive, or well named. Relations may be missing or odd. Little agreement would be available on some descriptions or names. But, with some work, improvement will occur. Just to understand where editing is needed, a good navigation tool (user interface) is needed. To simplify the data sufficiently for understanding the relationships effectively, a very special user interface will be important.

A large number of interested parties are needed to update the data. To get a large number of qualified users to start adding and repairing data, incentives such as allowing users to attach their name to new ttxs are used. Second, analysts who wish to obtain improved results will adjust data and make new filters, etc. which will be left for reuse.

Additional Purposes, Features, and Advantages

This section presents summaries of some of the system's other purposes and why the system has value in achieving those purposes.

Document Management and File Systems

Today, document management is most often seen in a personal computer where it is typical to have 300,000 files, most of which are hidden. In typical law offices, the number of paper documents and files is much higher. These documents and files must be controlled, categorized, and accessible, yet the control varies between the document tracking the football pool and the document key to a $Billion verdict. Categorization is extremely differentiated because one document may be relevant to many issues. No one wants to wait for the documents to become 'useable'. This system provides cnxpts to categorize information, and allows documents, as information resource info-items, to be 'occurrences' of the cnxpt. The cnxpts may be changed, recategorized, categorized in multiple ways, etc., but the documents stay with cnxpts unless moved, and documents can be 'occurrences' of multiple cnxpts. Workflows can manage documents as information resource info-items, and cnxpts. Alerts and several other paradigms greatly assist the user to find, obtain, categorize, and access the information resources. Goals are useful to add notes and new areas.

Law

The business of law has the major areas of Law—Precedent; Litigation—Theory of the Case and presentation; and Evidence—Discovery and presentation, among others. These each evolve over time and require detailed categorization of information within them. Each is 'crowd' oriented, where precedent is established by many jurisdictions, litigation always involves at least two theories of a case, and facts must be supported by evidence that must be obtained and analyzed by many participants. The application of evidence to facts involves the detailing of the specific evidence relevant to the fact, or, in terms here, the establishment of 'occurrences' to cnxpts representing facts. The breakdown of law to elements is a categorization of elements to be associated with law, precedent, contract, legal opinion, other elements, or doctrine, often hierarchically. The instant application provides efficiency, where issues are represented by cnxpts, specific opinion text is represented by cnxpts, and court orders, trial documents, statutes, and other documents are represented by information resource info-items. The issue and opinion text cnxpts are associated and categorized by associations between cnxpts by the searching or manual operations as discussed below. The result sets enable better searching not only for the first user interested in an issue but for all subsequent users. The associative search queries track issue development. The shared queries, paths, and results assist secondary users of many ilks, such as clerks and law students. The connection of facts to law by association gives refinement tools to an attorney, providing a review mechanism to his supervisors, an assembly mechanism for legal teams, and a structuring tool for writing or analysis. Discovery involves process/workflow management, document management, setting objectives (information sought), document review (classification, analysis, ranking, presentation arrangement), etc. all of which involve information resource info-items, people (and other txo's), and cnxpts, and all of which must be performed in cycles or in refinement. Litigation, in terms here, is the assembly of the facts in a theory, and the assembly of the evidence relevant to those fact into a presentation. In terms of the instant application, litigation is the establishment of cnxpts representing the theories, elements, and facts, and the setting of relationship strengths on associations and occurrences to show priorities or importance or for otherwise setting presentation order.

Other Advantages

Further objects and advantages of this invention will become apparent from a consideration of the drawings and ensuing descriptions.

I claim:

1. A computer-implemented method for providing predictions based upon a commonplace to a user, comprising:
   a. providing a computer storage to hold information added to the commonplace, the information comprising a plurality of cnxpts representing concepts and at least one association representing a relationship between concepts represented by cnxpts among the plurality of cnxpts;
   b. accepting a definition of zero or more knowledge models each comprising one or more definitions selected from the group of: a set of zero or more fxxts, a set of zero or more association types, and a set of one or more cnxpt types; and fulfilling at least one condition selected from the group of: no association is marked with a fxxt, no cnxpt is marked with a fxxt, at least one cnxpt is marked with at least one fxxt, and at least one cnxpt participates in one or more associations marked with at least one fxxt;
   c. accepting zero or more map definitions based upon each of the zero or more knowledge models and referencing the set of zero or more fxxts;
   d. accepting, as an identifiable, constructive map definition capable of being assigned an identifier, the collection of cnxpts and associations presently in the collection in a scene being viewed by the user;
   e. forming, based upon a map definition, a derived ontology for one or more domains of wisdom by extracting into the derived ontology references to objects selected from the group of: zero or more association classes, zero or more association class member instances, zero or more associations, zero or more cnxpt classes, zero or more cnxpt class member instances, zero or more cnxpt, and zero or more cnxpts;
   f. accepting, to implement a computational model sufficient to obtain the predictions sought according to each of the zero or more knowledge models utilized, necessary definitions of properties of zero or more objects of types selected from the group of: association classes, association class member instances, associations, cnxpt classes, cnxpt class member instances, and cnxpts;
   g. accepting necessary definitions of property equations to allow an implementation of a model sufficient to obtain the predictions sought according to each of the zero or more knowledge models utilized, of properties on object types selected from the group of: association classes, association class member instances, associations, cnxpt classes, cnxpt class member instances, and cnxpts, each equation yielding a value of a form selected from the group of: scalar, string, logical value string, vector, matrix, tensor, gradient, radian value, imaginary value, imaginary matrix, symbolic representation, image, sound, list, formatted text, object list, set members list, tree of node and edge objects, nodes and edges in a connected component of a graph, chart, image components, raster image, file, multi-file document, document list, and vector graphical image; each equation of a cnxpt property referencing operands of a form selected from the group of: scalar, string, logical value string, vector, matrix, tensor, gradient, radian value, imaginary value, imaginary matrix, symbolic representation, image, sound, list, formatted text, object list, set members list, tree of node and edge objects, nodes and edges in a connected component of a graph, chart, image components, raster image, file, multi-file document, document list, vector graphical image, and a named property of an object of a form selected from the group of: member of an object list, set members list, tree of node and edge object list, nodes in a connected component of a ttx graph, edges in a connected component of a ttx graph, metadata of a file, metadata of a multi-file document, metadata of documents in a list, the cnxpt occupying a role at the opposite end of an association, sibling cnxpts, uncle cnxpts, parent cnxpts, connected components of the cnxpt occupying a role at the opposite end of an association, children cnxpts, subtrees, paths of parents to connected roots, cnxpts on any definable path of a map, cnxpts on a defined node walk of a forest of a map, cnxpts on a defined node walk of a component of a map, cnxpts on a defined node walk of a defined set of cnxpts, ttxs on a defined node walk of a defined set of ttxs, cnxpts on an exhaustive node examination of a defined set of cnxpts, ttxs on an exhaustive node examination of a defined set of ttxs, cnxpts on any definable path to a cnxpt, ttxs on any definable path to a ttx, cnxpts on a defined node walk of to a connected cnxpt, ttxs on a defined node walk to a connected ttx, cnxpts on a defined node walk of a set of cnxpts returned by a function call with a range of cnxpts, ttxs on a defined node walk of a set of ttxs returned by a function call with a range of ttxs, cnxpts on a defined node walk of a set of cnxpts returned by a function call with a range of cnxpts, ttxs on a defined node walk of a defined set of ttxs returned by a function call with a range of ttxs, cnxpts on an exhaustive node examination of a defined set of cnxpts returned by a function call with a range of cnxpts, ttxs on an exhaustive node examination of a defined set of ttxs returned by a function call with a range of ttxs, cnxpts on an exhaustive node examination of a defined set of cnxpts or cnxpt sets returned by a function call with a range of cnxpts, ttxs on an exhaustive node examination of a defined set of ttxs or ttx sets returned by a function call with a range of ttxs, cnxpts on an exhaustive node examination of a defined set of cnxpts or cnxpt sets returned by a function call with a range of cnxpts where a cnxpt may appear more than once in the returned set and its properties are to be utilized once for each appearance, ttxs on an exhaustive node examination of a defined set of ttxs or ttx sets returned by a function call with a range of ttxs where a ttx may appear more than once in the returned set and its properties are to be utilized once for each appearance, cnxpts on an exhaustive node examination of a defined set of cnxpts or cnxpt sets returned by a function call with a range of cnxpts where a cnxpt may appear more than once in the returned set and its properties are to be utilized once for each appearance, ttxs on an exhaustive node examination of a defined set of ttxs or ttx sets returned by a function call with a range of ttxs where a ttx may appear more than once in the returned set and its properties are to be utilized once for each appearance, aggregated values of selected set of cnxpts collected by function of analytic invoked in an integrated fashion during modeling phase, aggregated values of selected set of ttxs collected by function of analytic invoked in an integrated fashion during modeling phase, transformed values of selected set of cnxpts collected by function of analytic invoked in an integrated fashion during modeling phase, transformed values of selected set of ttxs collected by function of analytic invoked in an integrated fashion during modeling phase, values of properties of selected set of cnxpts gated by values of other properties of the same or of different cnxpts, values of properties of selected set of ttxs gated by values of other properties of the same or of different ttxs, and like properties of edges;

h. accepting a default property value for each property where the property is to be utilized to implement a model sufficient to obtain the predictions sought according to the knowledge models utilized, where it is possible that the property equation may not yield a valid value;

i. accepting a user request to generate a skeletal structure for a map instance based upon a map definition of a source selected from the group of: a constructive map definition identified by the user; and a map definition referencing the set of zero or more fxxts;

j. generating, using said map definition referencing the set of zero or more fxxts, a skeletal structure for a map instance for said one or more domains of wisdom from the extracted derived ontology wherein the resulting map skeletal structure of said map instance is based upon a manner of analysis selected from the group of: a spanning forest manner, a descendent forest manner, an enhanced descendent forest manner, an ascendant forest manner, an enhanced ascendant forest manner, and a structure comprising a combination thereof;

k. generating, using said map definition referencing the set of zero or more fxxts, one or more organizations of knowledge to structure a map instance for said one or more domains of wisdom from the extracted derived ontology wherein the resulting map structure of said map instance is based upon a manner of map assembly selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof; wherein vertical and horizontal are mere duals for labeling in combinations;

l. Accepting definitions of zero or more concepts into one or more maps based upon a map definition;

m. accepting definitions of zero or more associations between concepts into one or more maps based upon a map definition; and n. providing tools for accessing, ideating, searching, organizing, protecting, commercializing, communicating, and extending ideas;
  i. providing access to the data contained in said one or more organizations of knowledge for one or more domains of wisdom of said map instance for utilization directed at a solution of a problem the user is considering;
  ii. displaying a visual derivative of said one or more organizations of knowledge for one or more domains of wisdom of said map instance to a user; and
  iii. displaying modeling results and predictions sought according to each of the zero or more knowledge models utilized;

whereby a marketplace for data related to specific concepts is create; whereby innovation inefficiencies are reduced through information reuse, sharing of analysis, and crowdsourcing to collect the wisdom of crowds, financial gain may be obtained from operating said system, the service provider may collect, track, and mine the demographic characteristics of startups to allow reporting on entity progress, reliability, risk, and value.

2. The collecting user interest information of claim 1, further including:
  a. collecting counts of unique and secondary views of ideas and categories of ideas by a user according to Navigation Based Relevance and Interest Collection means;
  b. preparing interest statistics regarding user interest shown in an idea;
  c. offering predictions about the future value of metrics regarding specific concepts;
  d. offering for sale said interest information; and
  e. delivering said interest information;
     such that predictions of future value are based in part on said statistics taken regarding interest shown;
     such that data collected regarding what a user views during querying or navigation of said commonplace is made a business resource; and
     so that tracking a user's interest regarding areas of said commonplace categorization index cnxpts assists in addressing market needs;
  whereby a user may obtain information describing the value of an idea or a category of ideas as indicated by said interest in said idea as shown by statistics on unique and secondary views of said idea or said category of ideas by said user.

3. The providing tools for accessing, ideating, searching, organizing, protecting, commercializing, communicating, and extending ideas of claim 1, further including:
  a. providing a controlled communications information repository; and
  b. providing tools for communicating regarding a cnxpt on a confidential basis with others on a narrow-chat basis knowing the expertise of the other party merely because of their willingness to communicate on the narrow-chat basis for a specific cnxpt category with those of similar level of expertise;
  whereby a user may confidently communicate with others regarding said cnxpt because of said controlled communications structure to share business plans within a protected mechanism for business plan submission and quiet review by validated investors, with access control to provide capturing of grantings of access, actual accesses, other disclosures, and the content of discussion between parties; whereby revenue is based upon specific types of information from said commonplace to provide inexpensive access by narrowing the resource purchased.

4. The providing tools for accessing, ideating, searching, organizing, protecting, commercializing, communicating, and extending ideas of claim 1, further including:
  a. protecting the description of a novel new idea;
  b. providing tools for preparing provisional patent applications describing said novel new idea recently entered into said commonplace;
  c. generating text for said patent application describing the context of said idea based upon its position in a categorization of technology ideas and the descriptions of said categories, the metadata regarding said novel new idea, and any description entered for said novel new idea;

and
d. providing tools for submission of said provisional patent application;
whereby said novel new idea may be protected rapidly to preserve the rights of the inventor and revenue is derived from granting access to said commonplace and said tools.

5. The providing tools for accessing, ideating, searching, organizing, protecting, commercializing, communicating, and extending ideas of claim 1, further including:
   a. providing tools for commercializing, and analyzing concepts;
   b. collecting information regarding the progression of commercialization of a technology concept;
   c. collecting vetting information for companies seeking funding;
   d. preparing the history of commercialization progress vetting information for release for due diligence by funding sources;
   e. obtaining consent of the owner to release said information; and
   f. releasing said information to a funding source;
   whereby business plans, consortium or company formation documents, founder profiles, consortium management information, negotiation documents, competitive company profiles, requirements of technology, application requirements, and consortium product line plans are maintained, and product lines and products are planned and managed using data of said commonplace obtained from the crowd and categorized with the assistance of said crowd, but also with data maintained privately and linked to said commonplace categorizations for rapid use by investment analysts, providing a blend of protected private, open source and for fee data all categorized uniformly so that all necessary information is made available at a reasonable cost to said owner so that said owner may obtain funding from crowdfunding portals or other funding sources without difficult data assembly and maintenance practices.

6. The providing tools for accessing, ideating, searching, organizing, protecting, commercializing, communicating, and extending ideas of claim 1, further including:
   a. providing a marketplace for requesting problem solutions, requesting idea extension, selling rights to ideas, requesting expertise, and offering expertise;
   b. providing online communities based upon specific concepts; and
   c. providing a communal innovation process where others may join to work on ideas in a protected environment on an access controlled basis;
   whereby innovation systems are set up and operated, system functions augment manual efforts, creativity is assisted, a commonplace is established to accept additions and refinements of ideas, ideation is captured, ideas are categorized, and searching and retrieval of ideas, data mining, prediction, and forecasting from said commonplace information is provided in a sharing and communing in innovation in a marketplace for ideas, information, jobs, technologies, services, and licenses.

7. The providing a marketplace for data related to specific concepts of claim 1, further including:
   a. providing a product planning process and methodology utilizing the categorization of the applications software Map Generation means and said commonplace data;
   b. providing modeling tools for product what if value analysis tuned to operate on said commonplace and said categorizations produced by said applications software Map Generation means;
   c. providing product management methodologies tuned to operate on said commonplace; and
   d. providing product planning information repository structures for managing and sharing product planning information on an access controlled basis;
   whereby company profiles, requirements of technology, application requirements, and product lines are maintained, and product lines and products are planned and managed using data of said commonplace obtained from the crowd and categorized with the assistance of said crowd, but also with data maintained privately and linked to said commonplace categorizations, providing a blend of protected private, open source and for fee data all categorized uniformly.

8. The providing a marketplace for data related to specific concepts of claim 1, further including:
   a. providing an environmental scanning process and methodology for managing the collection of competitive data utilizing the categorization of the applications software Map Generation means and said commonplace data;
   b. providing competitive analysis methodologies tuned to operate on said commonplace;
   c. providing modeling tools for competitive analysis what if value analysis tuned to operate on said commonplace and said categorizations produced by said applications software Map Generation means; and
   d. providing competitive product analysis information repository structures for managing and sharing competitive information on an access controlled basis;
   whereby competitive analysis research tools provide structure and analytical results for methodology based environmental scanning, competitor profiling, methodology based surveying, data analysis and calculating competitive posture using data of said commonplace obtained from the crowd and categorized with the assistance of said crowd, but also with data maintained privately and linked to said commonplace categorizations, providing a blend of protected private, open source and for fee data all categorized uniformly.

9. The providing a marketplace for data related to specific concepts of claim 1, further including:
   a. providing portfolio management, innovation investment planning, portfolio analysis, and data mining tools for innovation investment management utilizing the categorization of the applications software Map Generation means and said commonplace data;
   b. providing what if value analysis tuned to operate on said commonplace and said categorizations produced by said applications software Map Generation means;
   c. providing investment planning information repository structures for managing and sharing investment related information on an access controlled basis;
   d. providing investment process, portfolio, and investment accounting management for investing in technologies in investment pools or in external equities;
   e. providing investment methodologies, metrics, startup company information and competitive data utilizing said categorization of said applications software Map Generation means and said commonplace data for what if planning;
   f. providing methodologies for forming investment pools of companies in the same stage of commercialization; and g. tracking the progress of said companies toward commercialization to support investment planning;

whereby collected commonplace data including intellectual property information and startup statistics yield analytical results for a user's portfolio to assist said user in managing information collection, obtaining metrics for patent or technology value or gestation timeframe, managing owned or competitive portfolios, positioning inventions in portfolios for the market, measuring interest in intellectual property, planning portfolio exploitation, planning and managing investments, procuring intellectual property and managing intellectual property licenses and whereby investments in groups of companies at various stages of commercialization become possible by spreading risk between a large number of high risk entities and measuring risk by entity for mitigation and the service provider may collect, track, and mine the demographic characteristics of startups to allow reporting on entity progress, reliability, risk, and value, both using data of said commonplace obtained from the crowd and categorized with the assistance of said crowd, but also with data maintained privately linked to said commonplace categorizations, providing a blend of protected private, open source and for fee data all categorized uniformly and useful to investors.

10. The providing a marketplace for data related to specific concepts of claim 1, further including:
  a. accepting submissions of granular data for a property of a txo info-item according to Selling Value of Database means;
  b. marking said data as proprietary according to Mark Data as Fee for Use means;
  c. marking said data as a part of a data offering according to Mark Data Snippet as Part of DD-DataSet means;
  d. providing default mechanism and data fault mechanism for analytic, modeling, and prediction structures to ensure that users may obtain results even if said property information is attached to only some txos of the same type and so that said user has a proper understanding of the basis where data is unavailable;
  e. controlling access to said granular data marked as fee for use to allow access only to those having purchased said subscription rights for access;
  f. providing transaction based compensation to users providing information to said commonplace based upon the accessing of said information by other users;
  g. accounting for said compensation transactions;
  h. informing users of availability of said granular data when said analytic, model, or prediction attempts to access it, but cannot, allowing said user to purchase said access;
  i. accepting purchases of subscriptions to said data offerings according to Sell Packaged TTX-DataSets and Purchase Disaggregated DataSet Subscription means; and
  j. accounting for said information access transactions;

whereby an incentive is made available to users to obtain revenue by entering and authorizing release of valuable information for sale to others through said commonplace, revenue is distributable to those supplying even small quantities of information of specific types to said commonplace, said property values useful in models or predictions and having sufficient value to others may be offered for use even if the same property is sparsely set on similar info-items, while said customer may also rely upon other data of said commonplace obtained from the crowd and categorized with the assistance of said crowd, but also with data maintained privately linked to said commonplace categorizations, providing a blend of protected private, open source and for fee data all categorized uniformly, and said user is provided access to for fee data only based upon rights they purchase to provide disaggregated data e-commerce, licensing, and delivery as a business model.

* * * * *